(12) United States Patent
Granbery (10) Patent No.: US 10,839,368 B2
(45) Date of Patent: Nov. 17, 2020

(54) AUTOMATIC WIRELESS CONSUMER CHECKINS

(71) Applicant: PAYPAL, INC., San Jose, CA (US)

(72) Inventor: John Hastings Granbery, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 289 days.

(21) Appl. No.: 15/865,111

(22) Filed: Jan. 8, 2018

(65) Prior Publication Data
US 2018/0144333 A1    May 24, 2018

Related U.S. Application Data

(63) Continuation of application No. 14/021,045, filed on Sep. 9, 2013, now abandoned.
(Continued)

(51) Int. Cl.
*G06Q 20/32*    (2012.01)
*G06Q 20/20*    (2012.01)
(Continued)

(52) U.S. Cl.
CPC ......... *G06Q 20/3224* (2013.01); *G06Q 20/20* (2013.01); *G06Q 20/202* (2013.01);
(Continued)

(58) Field of Classification Search
CPC .. G06Q 20/3224; G06Q 20/20; G06Q 20/202; G06Q 20/32; G06Q 20/322;
(Continued)

(56) References Cited

U.S. PATENT DOCUMENTS 6,587,835 B1    7/2003    Treyz et al.
6,711,474 B1    3/2004    Treyz et al.
(Continued)

FOREIGN PATENT DOCUMENTS

CN    102822855 A    12/2012
EP       1388797         2/2004
(Continued)

OTHER PUBLICATIONS

Research and markets: The future of mobile payments 2012. (May 16, 2012). M2 Presswire Retrieved Oct. 20, 2014.
(Continued)

*Primary Examiner* — James D Nigh
(74) *Attorney, Agent, or Firm* — Haynes and Boone, LLP (57) ABSTRACT

Computing systems and methods for facilitating consumer transactions in retail and other establishments include communication interfaces adapted to couple a computing system to a plurality of third party phones or other mobile electronic devices, storage components adapted to store user information, participating merchant information, or any combination thereof, and processors in communication with the communication interfaces and storage components. The processors are adapted to facilitate the automatic wireless checkins of third party users of the third party phones or other mobile electronic devices at participating merchants. Such automatic wireless checkins take place when the third party phones or mobile electronic devices are simply present at the participating merchants, without any affirmative activity by the users at the participating merchants.

20 Claims, 5 Drawing Sheets

Related U.S. Application Data (60) Provisional application No. 61/747,918, filed on Dec. 31, 2012.

(51) Int. Cl.
*G06Q 20/38* (2012.01)
*G06Q 30/02* (2012.01)
*H04L 12/931* (2013.01)
*H04W 4/021* (2018.01)
*H04W 4/02* (2018.01)
*H04W 88/02* (2009.01)

(52) U.S. Cl.
CPC .......... *G06Q 20/32* (2013.01); *G06Q 20/322* (2013.01); *G06Q 20/327* (2013.01); *G06Q 20/3226* (2013.01); *G06Q 20/3278* (2013.01); *G06Q 20/3829* (2013.01); *G06Q 30/0261* (2013.01); *G06Q 30/0267* (2013.01); *H04L 49/201* (2013.01); *H04W 4/021* (2013.01); *H04W 4/023* (2013.01); *H04W 88/02* (2013.01)

(58) Field of Classification Search
CPC ............. G06Q 20/3226; G06Q 20/327; G06Q 20/3278; G06Q 20/3829; G06Q 30/0261; G06Q 30/0267; H04L 49/201; H04W 4/021; H04W 4/023; H04W 88/02
USPC .......................................................... 705/64
See application file for complete search history.

(56) References Cited

U.S. PATENT DOCUMENTS

| | | | |
|---|---|---|---|
| 6,928,263 B2 * | 8/2005 | Blake ..................... | H04B 1/713 375/E1.033 |
| 8,045,961 B2 | 10/2011 | Ayed et al. | |
| 8,090,616 B2 | 1/2012 | Proctor, Jr. et al. | |
| 8,135,624 B1 | 3/2012 | Ramalingam et al. | |
| 8,346,672 B1 | 1/2013 | Weiner et al. | |
| 8,438,066 B1 | 5/2013 | Yuen et al. | |
| 8,682,802 B1 | 3/2014 | Kannanari | |
| 8,856,045 B1 | 10/2014 | Patel et al. | |
| D717,309 S | 11/2014 | Govindarajan | |
| 8,972,296 B2 | 3/2015 | Govindarajan et al. | |
| 9,026,460 B2 | 5/2015 | Grigg et al. | |
| 9,131,343 B2 | 9/2015 | Kandekar | |
| 9,177,315 B2 | 11/2015 | Pitroda et al. | |
| 9,264,151 B1 * | 2/2016 | Emigh ............... | G06Q 30/0226 |
| 9,405,897 B1 | 8/2016 | Bailey et al. | |
| 2003/0004743 A1 | 1/2003 | Callegari | |
| 2003/0191818 A1 | 10/2003 | Rankin et al. | |
| 2004/0019571 A1 | 1/2004 | Hurwitz et al. | |
| 2004/0243519 A1 | 12/2004 | Perttila et al. | |
| 2007/0125838 A1 | 6/2007 | Law et al. | |
| 2007/0235519 A1 | 10/2007 | Jang et al. | |
| 2008/0096579 A1 | 4/2008 | Gill | |
| 2008/0280624 A1 | 11/2008 | Wrappe | |
| 2009/0327135 A1 | 12/2009 | Nguyen et al. | |
| 2010/0063867 A1 | 3/2010 | Proctor, Jr. et al. | |
| 2010/0082481 A1 | 4/2010 | Lin et al. | |
| 2010/0169130 A1 | 7/2010 | Fineman et al. | |
| 2011/0010291 A1 | 1/2011 | Adams | |
| 2011/0021142 A1 | 1/2011 | Desai et al. | |
| 2012/0050098 A1 | 3/2012 | Kuehnel et al. | |
| 2012/0150669 A1 | 6/2012 | Langley et al. | |
| 2012/0166337 A1 | 6/2012 | Park et al. | |
| 2012/0173431 A1 | 7/2012 | Ritchie et al. | |
| 2012/0254029 A1 | 10/2012 | Layne et al. | |
| 2012/0257561 A1 | 10/2012 | Redding | |
| 2012/0258669 A1 | 10/2012 | Honkanen et al. | |
| 2012/0265623 A1 | 10/2012 | Zhu et al. | |
| 2013/0040574 A1 | 2/2013 | Hiilyard | |
| 2013/0054474 A1 | 2/2013 | Yeager | |
| 2013/0065584 A1 | 3/2013 | Lyon et al. | |
| 2013/0073463 A1 * | 3/2013 | Dimmick .............. | G06F 21/445 705/44 |
| 2013/0099920 A1 | 4/2013 | Song et al. | |
| 2013/0106684 A1 | 5/2013 | Weast et al. | |
| 2013/0109323 A1 | 5/2013 | Ruutu et al. | |
| 2013/0166399 A1 | 6/2013 | Awad | |
| 2013/0225197 A1 | 8/2013 | McGregor et al. | |
| 2013/0251216 A1 | 9/2013 | Smowton et al. | |
| 2013/0262317 A1 | 10/2013 | Collinge et al. | |
| 2013/0273843 A1 | 10/2013 | Shimota et al. | |
| 2013/0273906 A1 | 10/2013 | Cucala Garcia et al. | |
| 2013/0281084 A1 | 10/2013 | Batada et al. | |
| 2014/0001264 A1 | 1/2014 | Babu et al. | |
| 2014/0040147 A1 * | 2/2014 | Varadarajan ....... | G06Q 20/3823 705/71 |
| 2014/0075523 A1 | 3/2014 | Tuomaala et al. | |
| 2014/0108241 A1 | 4/2014 | Tunnel et al. | |
| 2014/0113558 A1 | 4/2014 | Varoglu et al. | |
| 2014/0114780 A1 | 4/2014 | Menefee et al. | |
| 2014/0160978 A1 | 6/2014 | Palin et al. | |
| 2014/0172700 A1 | 6/2014 | Teuwen et al. | |
| 2014/0188708 A1 | 7/2014 | Govindarajan et al. | |
| 2014/0188733 A1 | 7/2014 | Granbery | |
| 2015/0094080 A1 | 4/2015 | Snyder et al. | |

FOREIGN PATENT DOCUMENTS

| | | | |
|---|---|---|---|
| WO | WO 2010/109271 A1 | 9/2010 | |
| WO | WO-2010109271 A1 * | 9/2010 | ............. G06Q 20/12 |

OTHER PUBLICATIONS

PCT International Search Report and the Written Opinion dated Jan. 3, 2014, in related International Application No. PCT/US2013/059413.
PCT International Search Report and the Written Opinion dated Dec. 2, 2014, in International Application No. PCT/US2014/053289.
International Report and Written Opinion, dated Jan. 3, 2014, 15 pages, No. PCT/US2013/059413.
Sadhukhan et al., "A Middleware Based Approach to Dynamically Deploy Location Based Services onto Heterogeneous Mobiel Devices Using Bluetooth in Indoor Environment," Springer-Verlag, Sep. 10, 2010, 14 pages.
Sunil Jogi et al.: "Ultra Wideband Demystified—Technologies Applications and System Design Considerations", Mar. 24, 2009, (Mar. 24, 2009), River Publishers, 1 pages.
Houda Labiod et al.: "Wi-Fi(TM), Bluetooth(TM), Zigbee(TM) and WiMax(TM) 2007th Edition", Jun. 25, 2007 (Jun. 25, 2007), Springer, 7 pages, Ch 03,195-209.
George Coulouris et al.: "Distributed Systems: Concepts and Design (5th Edition)", May 7, 2011 (May 7, 2011), Addison-Wesley, US.
Michael Miller: "Discovering Bluetooth",Sybex Inc, Aug. 31, 2001, (Aug. 31, 2001), Retrieved from the Internets: <URL:http://ebook.eqbal.ac.ir/Computers%20-%20Informatin%20Technology/Discovering_Bluetooth.2001.Sybex.pdf> [retrieved on Apr. 29, 2016].
Audiovox Accessories Corporation: "RCA user manual—TH2O series/TH22 series", Internet Article, Aug. 13, 2010 (Aug. 13, 2010), Retrieved from the Internet<URL:http://www.rcaaudiovideo.com/docs/common/TH2004/TH2004_OM.pdf>[retrieved on Apr. 29, 2016].
Wikipedia: "Bluetooth", Internet Article, Dec. 30, 2012, (Dec. 30, 2012), Retrieved from the Internet, <URL:https://en.wikipedia.org/w/index.php?title=Bluetooth&oldid=53Q426233>, [retrieved on Apr. 29, 2016].
Wikipedia: "Near field communication", Internet Article, Dec. 27, 2012 (Dec. 27, 2012), Retrieved from the Internet, <URL:https://en.wikipedia.org/w/index.php?title=Near_field_communication&oldid=529985233>, [retrieved on Apr. 29, 2016].
Jennifer Bray et al.: "Bluetooth Application Developer's Guide", Dec. 31, 2001 (Dec. 31, 2001), Syngress, 13 pages.
Langer Josef et al.: "Anwendungen and Technik von Near Field Communication (NFC)", Sep. 16, 2010 (Sep. 16, 2010), Springer, Heidelberg, 9 pages.

(56) References Cited

OTHER PUBLICATIONS

Wen-Chen Hu et al: "Advances in Security and Payment Methods for Mobile Commerce", Nov. 1, 2004 (Nov. 1, 2004), Idea Group Publishing, 6 pages.

Daniel Amor: "Internet Future Strategies: How Pervasive Computing Services Will Change the World", Jul. 23, 2001 (Jul. 23, 2001), Prentice Hall, 6 pages.

Wikipedia: "Location-based service", Internet Article, Dec. 28, 2012 (Dec. 28, 2012), Retrieved from the Internet, <URL:https://en.wikipedia.org/w/index.php?title=Locationbased_service&oldid=530078881, [retrieved on Dec. 20, 2017].

Wikipedia: "Proximity marketing", Internet Article, Sep. 20, 2012 (Sep. 20, 2012), Retrieved from the Internet, <URL:https://en.wikipedia.org/w/index.php?title=Proximity_marketing&oldid=513616176>, [retrieved on Dec. 20, 2017].

Wikipedia: "Mobile app", Internet Article, Dec. 27, 2012 (Dec. 27, 2012), Retrieved from the Internet, <URL:https://en.wikipedia.org/w/index.php?title=Mobile_app&oldid=530033317>, [retrieved on Dec. 20, 2017].

Keith Mayes et al: "Smart Cards, Tokens, Security and Applications", Jan. 7, 2008 (Jan. 7, 2008), Springer US.

Mastercard: "PayPass—Mag Stripe—Technical Specifications V3.3", Dec. 31, 2007 (Dec. 31, 2007), Retrieved from the Internet, <URL:http://data.cardzone.cz/contactless/PayPass%20-%20Mag%20Stripe%20(V3.3).pdf>, [retrieved on Dec. 4, 2019].

Michael Roland et al.: "Cloning Credit Cards: A combined pre-play and downgrade attack on EMV Contactless", Proceeding WOOT'13, Proceedings of the 7th USENIX conference on Offensive Technologies, Aug. 13, 2013 (Aug. 13, 2013), Retrieved from the Internet, <URL:http://0b4af6cdc2f0c5998459-c0245c5c937c5dedcca3f1764ecc9b2f.r43.cf2fackcdn.com/12055-woot13-roland.pdf>, [retrieved on Aug. 25, 2015].

European Office Action, Application EP 13867008.8-1222, dated Dec. 12, 2019, 11 pages.

\* cited by examiner

AUTOMATIC WIRELESS CONSUMER CHECKINS

CROSS REFERENCE TO RELATED APPLICATIONS

This application is a continuation of U.S. patent application Ser. No. 14/021,045, filed Sep. 9, 2013, which claims the benefit of and priority to U.S. Provisional Application No. 61/747,918, filed Dec. 31, 2012, both of which are incorporated by reference herein in their entirety.

TECHNICAL FIELD

The present disclosure relates generally to systems and devices that facilitate consumer transactions, and more particularly to systems and devices for consumer transactions that utilize personal mobile devices of consumers.

BACKGROUND

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics. Technology advances have also allowed for a wider variety of devices and transaction types in the retail and other marketplaces.

One example of a relatively new development within the realm of electronic commerce is the ability to allow a consumer to pay for a good or service at a point of sale through the use of his or her smart phone or other personal mobile device. A user merely needs to have an appropriate payment application or "app" on his or her device, whereupon the user can present his or her phone or other similar device at an appropriate time and location at a retail or other establishment. The retailer or other seller or service provider can then "checkin" the given user through some process of reading his or her smart phone or other similar device, after which the seller or service provider can accept payment or credit through some form of communication with the checked in or acknowledged device. This "checkin" ability to accept payment or credit without the use of cash, checks, credit cards, or other traditional payment means can be particularly helpful in many settings.

Unfortunately, such setups are not without their own drawbacks and inconvenient features. In many instances, the current checkin process can be time consuming. For example, current checkin procedures often require the customer to take out his or her phone or other device at a point of sale in order to make a payment or provide a credit. This often involves the device searching for the appropriate wireless connection at the store, searching for the store among many possible choices on the device, and/or manual user input or selection on his or her personal mobile device, all of which can take some inconvenient amount of time. Even small amounts of time that are less than a minute can be frustrating where other consumers are waiting in line behind the user at a register or other point of sale.

BRIEF DESCRIPTION OF THE DRAWINGS

The included drawings are for illustrative purposes and serve only to provide examples of possible systems and methods for the disclosed automatic wireless consumer checkins. These drawings in no way limit any changes in form and detail that may be made to that which is disclosed by one skilled in the art without departing from the spirit and scope of this disclosure.

DETAILED DESCRIPTION

What is needed are systems and methods that provide for faster or more automatic checkins where cellular phones or other mobile devices are used for consumer transactions.

Exemplary applications of apparatuses and methods are described in this section. These examples are being provided solely to add context and aid in the understanding of the embodiments disclosed herein. It will thus be apparent to one skilled in the art that the disclosed embodiments may be practiced without some or all of these specific details. In other instances, well known process steps have not been described in detail in order to avoid unnecessarily obscuring the disclosed embodiments. Other applications are possible, such that the following examples should not be taken as limiting.

In the following detailed description, references are made to the accompanying drawings, which form a part of the description and in which are shown, by way of illustration, specific embodiments. Although these embodiments are described in sufficient detail to enable one skilled in the art to practice the disclosed embodiments, it is understood that these examples are not limiting, such that other embodiments may be used, and changes may be made without departing from the spirit and scope of the disclosure.

The disclosed embodiments relate to devices, systems and methods involving activities with respect to the purchase of goods or services, such as in a retail setting. In various particular embodiments, the subject devices, systems or methods can involve one or more user devices in communication over a network. Such a network can facilitate the improved and purchase of goods or services, such as through a more robust use of a cellular telephone or other personal mobile device. The subject systems or methods can utilize programs and/or associated hardware on user phones and other mobile devices to facilitate the automated checkins of users when they are at a cooperating or subscribing location. Users that have been automatically checked in by such a system can then more readily pay or provide credit for goods or services at a point of sale in the establishment.

While the various examples disclosed herein focus on particular aspects regarding the purchase of goods or services in a retail or similar setting, it will be understood that the various principles and embodiments disclosed herein can be applied to other types of applications and arrangements involving consumer or personal transactions as well. For example, automated checkins at a library, private club, public venue or government building, may also utilize one or more of the aspects and features found in the various systems and methods provided.

Systems and Devices

Figure 1:
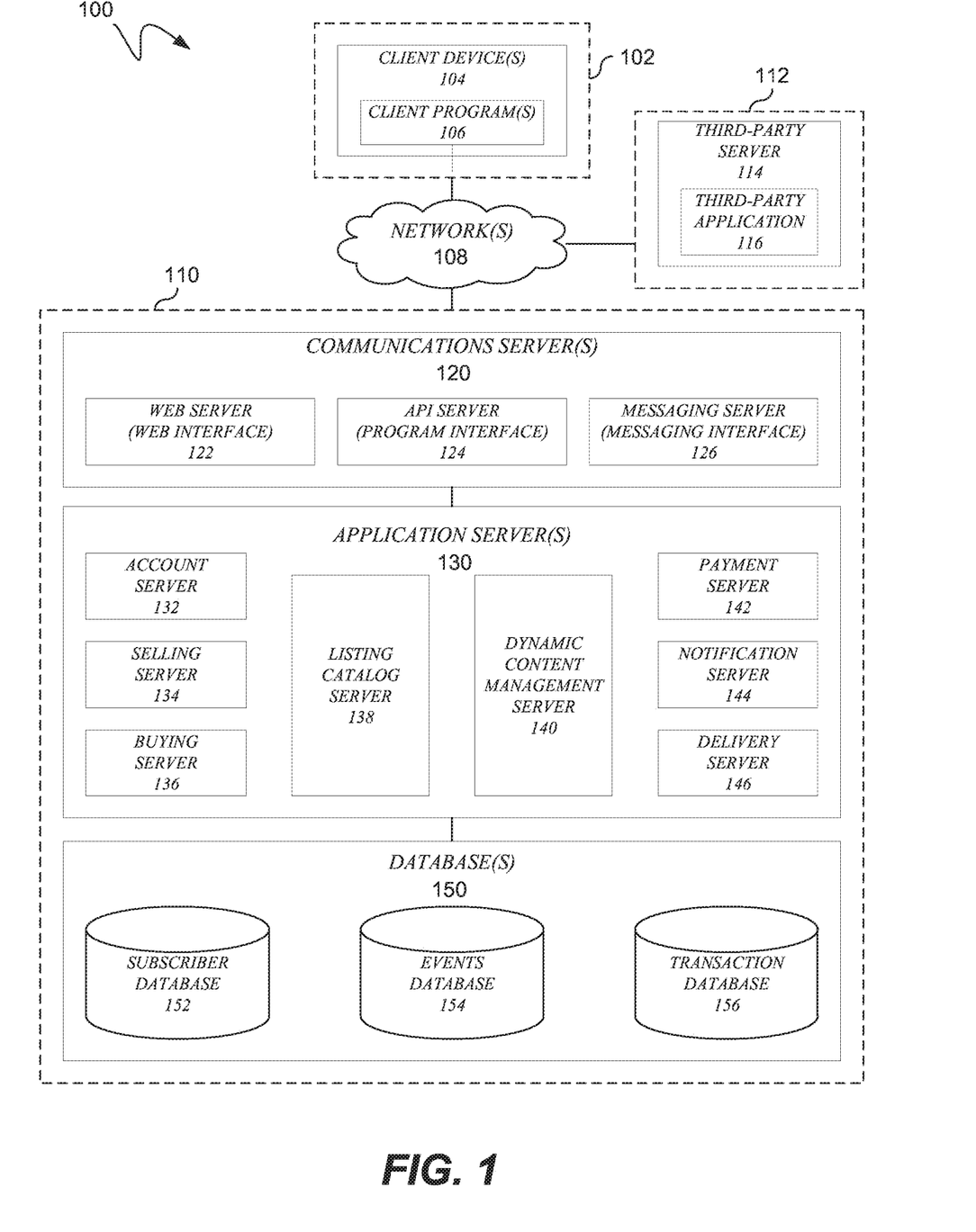
FIG. 1 illustrates in block diagram format an exemplary computing system adapted for implementing the purchase of goods or services according to some embodiments.

Beginning with FIG. 1, an exemplary embodiment of a computing system adapted for implementing the purchase of goods or services is illustrated in block diagram format. As shown, computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a client 102 that may comprise or employ one or more client devices 104, such as a laptop, a mobile computing device, a PC, and/or any other computing device having computing and/or communications capabilities in accordance with the described embodiments. In particular, it is specifically contemplated that client devices 104 can include a cellular telephone or other similar mobile device that a user can carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. One or more of client programs 106 may display various graphical user interfaces (GUIs) to present information to and/or receive information from one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various computing devices 104 and/or client programs 106. Accordingly, a communications session between client 102 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a WAN, a WWAN, a WLAN, a mobile telephone network, a landline telephone network, a VoIP network, as well as other suitable networks. For example, client 102 may communicate with network-based system 110 over the Internet or other suitable WAN by sending and or receiving information via interaction with a web site, e-mail, IM session, and/or video messaging session. Any of a wide variety of suitable communication types between client 102 and system 110 can take place, as will be readily appreciated. In particular, wireless communications of any suitable form may take place between client 102 and system 110, such as that which often occurs in the case of mobile phones or other personal mobile devices.

In various embodiments, computing system 100 can include, among other elements, a third party 112, which may comprise or employ a third-party server 114 hosting a third-party application 116. In various implementations, third-party server 314 and/or third-party application 116 may host a web site associated with or employed by a third party 112. For example, third-party server 114 and/or third-party application 116 may enable network-based system 110 to provide client 102 with additional services and/or information, such as advertisements or promotions regarding sale items. In some embodiments, one or more of client programs 106 may be used to access network-based system 110 via third party 112. For example, client 102 may use a web client to access and/or receive content from network-based system 110 after initially communicating with a third-party web site 112.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, and/or configured to provide various online marketplace and/or purchasing services to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When implemented as an online goods and services marketplace, application servers 130 of network-based system 110 may provide various online marketplace services including, for example, account services, buying services, selling services, listing catalog services, dynamic content management services, delivery services, payment services, and notification services. Application servers 130 may include an account server 132, a buying server 134, a selling server 136, a listing catalog server 138, a dynamic content management server 140, a payment server 142, a notification server 144, and/or a delivery server 146 structured and arranged to provide such online marketplace services.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
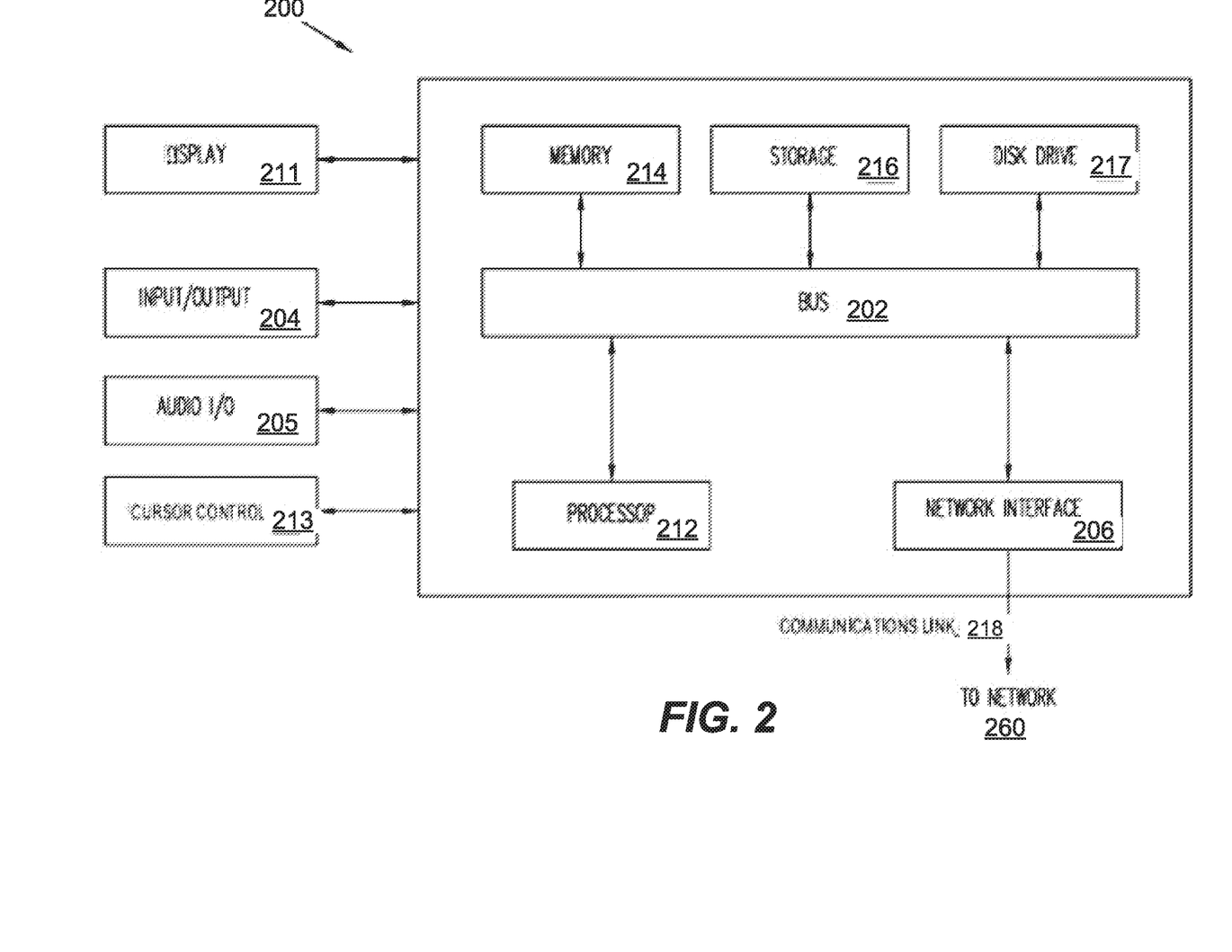
FIG. 2 illustrates in block diagram format an exemplary computer system suitable for implementing on one or more devices of the computing system in FIG. 1 according to some embodiments.

Continuing with FIG. 2, an exemplary computer system 200 suitable for implementing on one or more devices of the computing system in FIG. 1 is depicted in block diagram format. In various implementations, a device that includes computer system 200 may comprise a personal computing device (e.g., a smart or mobile phone, a computing tablet, a personal computer, laptop, PDA, Bluetooth device, key FOB, badge, etc.) that is capable of communicating with a network. The goods or services provider may utilize a network computing device (e.g., a network server) capable of communicating with the network. It should be appreciated that each of the devices utilized by users, goods and services providers, and payment providers may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, or a payment provider server via a network. In various embodiments, such as for many cellular telephone and other mobile device embodiments, this transmission can be wireless, although other transmission mediums and methods may also be suitable. A processor 212, which can be a micro-controller, digital signal processor (DSP), or other processing component, processes these various signals, such as for display on computer system 200 or transmission to other devices over a network 260 via a communication link 218. Again, communication link 218 can simply be a wireless communication form in some embodiments. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Such software may be stored and/or used at one or more locations along or throughout the system, at client 102, network-based system 110, or both.

Automatic Wireless Checkins

As will be readily appreciated, the foregoing networks, systems, devices, methods and variations thereof can be used to implement an automated checkin of users at a cooperating or subscribing establishment, such that subsequent purchase transactions and other activities can be more streamlined and convenient. Rather than having users resort to known procedures involving wireless checkins with their own personal mobile devices at a point of sale, a more user friendly system involving the use of Bluetooth Low Energy ("BLE") in association with separate user phones, other mobile devices or any suitable user computing devices can be provided. One or more applications or "apps" can be provided for download and use on private consumer phones and mobile devices to help facilitate the use of the automated checkin process. In various embodiments, such automated checkins can be facilitated by a transaction service provider, such as, for example, PayPal Inc. of San Jose, Calif.

Bluetooth low energy ("BLE") is a relatively new feature of Bluetooth 4.0 wireless radio technology. BLE is intended for primarily low-power and low-latency applications for wireless devices within a short range, such as up to about 50 meters. Devices using BLE utilize a protocol having intermittent communications, smaller amounts of data transfer and bandwidths, as well as low duty cycles. As such, BLE can consume only a fraction of the power of traditional Bluetooth enabled products for Bluetooth communications. In many cases, BLE products will be able to operate more than a year on a tiny battery without recharging. The use of BLE can allow for a wider variety of applications in relatively low power devices, such as smart phones and other personal mobile devices.

In various embodiments, it is specifically contemplated that personal smart phones and other mobile devices that are equipped with BLE capabilities can be provided with programs or "apps" that leverage the use of these capabilities to allow for the automated checkins of owners or users carrying those devices when they are merely in or at a participating establishment. BLE allows for constant passive scanning for Bluetooth peripherals. A suitable program or app on a user device can be set to run frequently in the background under a BLE protocol, always monitoring for a significant change in location and/or presence of an appropriate BLE peripheral at a merchant or vendor. When the owner or user of the phone or personal mobile device enters a store or other participating location, he or she would pass by a BLE peripheral by the entrance or at some other appropriate location. This merchant or third party run BLE peripheral can be sending out a signal, such as for advertising a checkin service with a universally unique identifier ("UUID") and store information.

It is worth noting that the communication process between the merchant dongle or other beacon and the purchaser smart phone or other mobile device can take place on an unencrypted channel. This is significant in that the communications between the devices actually involve a financial transaction, the details of which can be detected by any party due to the unencrypted nature of the communication. While the use of an unencrypted channel provides greater speed and flexibility for the use of many different devices, certain precautions should be taken to protect the sensitive nature of the financial or other consumer transaction. This can be accomplished by providing, for example, tokens for the devices to identify each other only in a generic fashion, with all sensitive information being retained remotely by a financial processing entity or other service provider. Also, since communications take place over unencrypted channels, there is no reason for a device to retain long term specific identifiers or information that is typically needed for bonded or encrypted communications.

The smart phone or other mobile user device would wirelessly detect or "see" this outside BLE peripheral due to the constant background running of the app under a BLE protocol. Once detection is made at a low or lowest energy level and duty cycle, a ramp up in energy, duty cycle, and/or other operating parameters can take place so that a handshake and checkin can take place automatically between the user device and the merchant device. In particular, the privately or separately owned mobile phone or other mobile user device can connect to the service at the store, merchant or other location, encrypt a payment token along with the beacon token and write it to the service. If the merchant possesses the necessary keys to decrypt the payment token, the information could then be decrypted and used directly by the merchant themself. Alternatively, the information may be passed by the peripheral or other component up to a remote third party payment provider, such as for example, PayPal. The third party provider can then decrypt the payment token and execute a checkin at the establishment on behalf of the customer or user. Later, when the customer or user approaches a checkout aisle or other point of sale, another BLE peripheral advertising a checkout service can be present. Various checks and processes can then take place based on the transmit power and received power of the BLE peripheral, mobile user device, or both, and the phone or other mobile device can again write credentials to the checkout service. This associates the customer with a particular register. Checkout can then proceed as normal for a checkin payment. In some embodiments, after an initial checkin, the mobile user device may be capable of advertising a one-time use UUID for a BLE peripheral. When the BLE peripheral receives the advertised UUID, the BLE would attempt to establish communications with the mobile device.

In order for the actual handshake and communication between the dongle or beacon and the user mobile device to be effective over an unencrypted channel, it is important that both devices already be initialized and signed up for the same remote third party service provider, such as Paypal or any other suitable provider. Each device can then be provided with public encryption keys, private encryption keys and payment tokens prior to meeting each other, such that the devices are able to recognize each other as belonging to the proper service when the signals are detected and the handshake begins. Information is then exchanged purely by way of keys and payment tokens, such that no sensitive information is ever exchanged over the unencrypted channel. Details of such key and token provisions, as well as the handshake process and protocols are provided below with respect to FIG. 5.

With the use of BLE and appropriate apps or programs on user devices, this entire process can be automated in many instances. This can save significant amounts of time and inconvenience for many consumers at the point of sale. In some embodiments, a beep, other sound, vibration, visual display or other output from the smart phone or other mobile user device can be provided upon automatic checkin. This can simply provide a notice to the user that they are now checked in at the establishment. Different sounds or indicators on a display can confirm to the user which establishment(s) the user is currently checked in, such as where malls or other locations having multiple vendors in a small area might be applicable. In this manner, a user can be made aware that he or she is checked in and is able to readily shop here and check out quickly.

In various further embodiments, other procedures can be implemented to take advantage of the knowledge that a user is at a given merchant location and that a purchase or other point of sale activity might be imminent. The bidirectional nature of BLE can allow for a more robust experience and interaction between the merchant, user, and/or third party payment service provider. For example, advertising and promotional offers can be directed to a known user from the merchant, the payment service provider, or both. These items can rely on a known history and other parameters applicable to the specific user. For example, notices can be provided regarding sales or promotions on items or related items that are known to be of interest or the subject of past purchases by a known user. Also, a step-up procedure to assess risk can be implemented, such that the user can be prompted for a PIN or other identifier if there is any concern over risk for that user or about a particular purchase. In addition, a customized offer of credit can be made for the user based upon various known factors in the associated customer account, history or profile. In various embodiments, a signal to the phone or device to buzz or emit a sound or display can be provided if the merchant or third party payment service provider might need a PIN or other verification at the time of purchase.

In various embodiments, the one or more processors 212 can be located on a remote server, such as a third party payment service provider server, while the display and user inputs can be located onsite at a store or other participating location, such as on a register, and/or also on a mobile user device, such as a smart phone. Processor(s) 212 can be adapted to facilitate an automatic check in process, and can be further adapted to accept and process a request to purchase goods upon checkout. Other services can be provided by processor(s) 212, such as any of the actions or services set forth herein.

Figure 3:
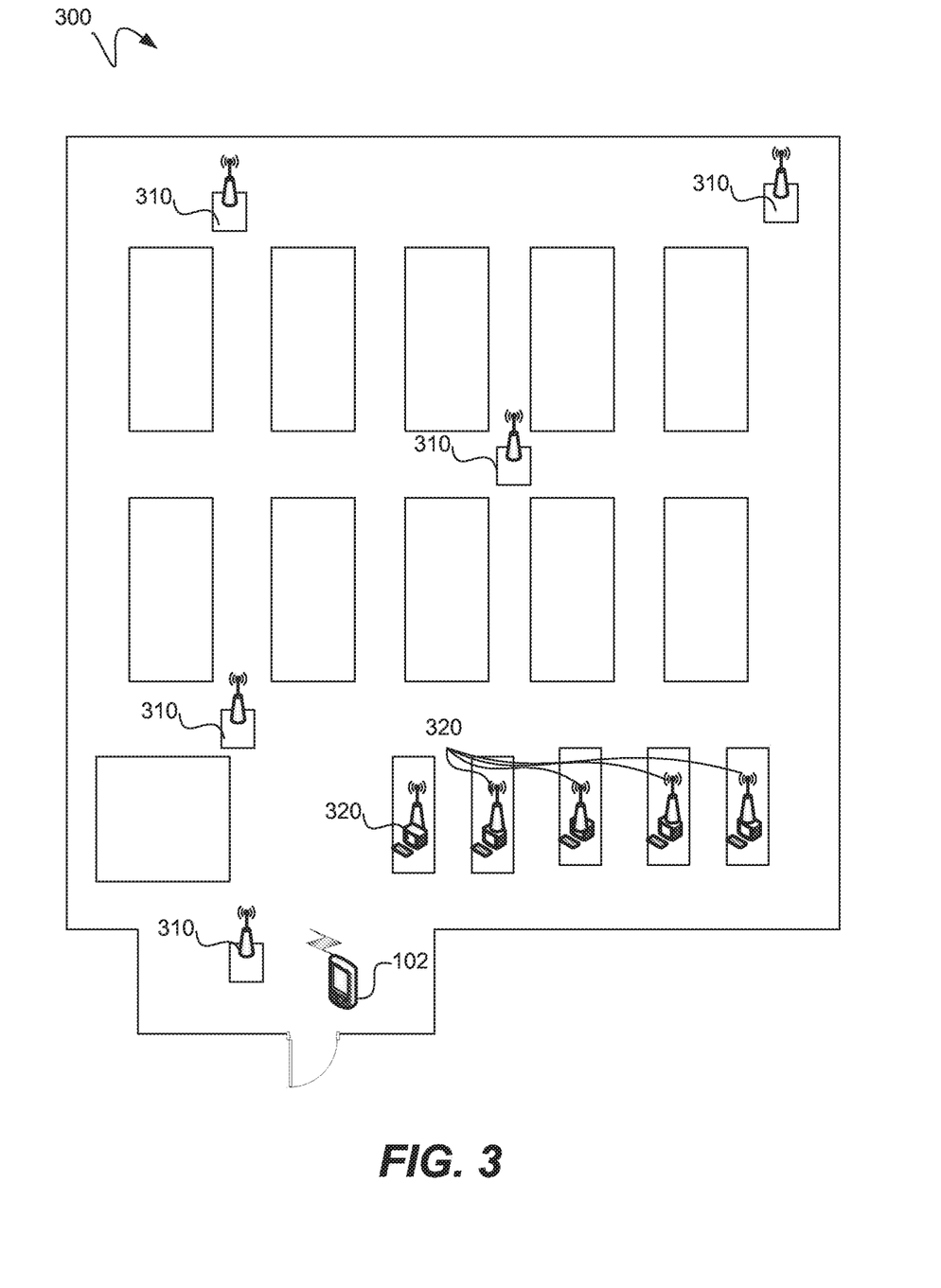
FIG. 3 illustrates in block diagram format an exemplary merchant layout and associated system components adapted for implementing the purchase of goods or services using automatic wireless consumer checkins according to some embodiments.

FIG. 3 illustrates in block diagram format an exemplary merchant layout and associated system components adapted for implementing the purchase of goods or services using automatic wireless consumer checkins according to some embodiments. It will be readily appreciated that this merchant layout is only provided for purposes of illustration, and that many other types of layouts, devices, procedures and the like could be effectively implemented using the various principles of the present disclosure.

Merchant layout 300 includes an indoor store floor having a number of BLE signaling devices 310. These devices can be distributed strategically throughout the store or establishment, such as near the front door, at central locations, and/or at locations of high volume traffic within the establishment. One or more third party mobile user devices 102, such as phones, PDAs, tablets or the like, can interact with one or more of the signaling devices 310 throughout the store. Preferably, only one interaction with a signaling device 310 is needed for a checkin, although it may be useful for an establishment to know where a user is located and/or user travel and shopping patterns or habits within a store. Such further information can be used to provide further advertising and promotional offers (e.g., related to something at or near where the user is physically located), and/or to authenticate the actual user versus one who may have stolen or is otherwise using the mobile device in an unauthorized fashion. Such further authentication can involve checking known user traffic and shopping patterns against what is currently happening for a given device.

An actual automatic checkin process can involve a subscribed or affirmatively active user entering a store or establishment, whereupon the phone or other user device on the person of the user has a low level background program running that detects a low level BLE signal from one or more devices 310 in the store. The phone or device 102 can then "wake up" and communicate on a more active level with the store device 310. A UUID and token can be generated and assigned to the user device for a particular time, location and session, with appropriate expiration and other safeguards in place to protect against fraud or other misuse. For example, a period of one or two hours might suffice for a typical checkin session or event.

The UUID, token, and other informational items can be exchanged between the store device and the user device, whereupon the user device (and user) are "checked in" at that location and are ready to make a purchase or otherwise check out at some later time. Other informational items exchanged or provided can include the store type, name and number, store location or address, actual or likely items of interest or purchase for the user, a user history at that location, similar locations, and/or overall, the uniquely identified user, a maximum amount of credit or currency available overall to the user for an automated purchase, the amount of credit or currency that may be used without a PIN or other affirmative user authentication being required, among other possibilities. This information can be stored on the user device for a session or longer, can be provided to the store or other establishment, and can also be provided to a remotely owned and controlled separate payment service provider.

After checkin, various intermediate transactions, offers, credit or risk assessments can take place, whereupon check out or purchase can take place at any of a number of terminals or registers 320. If needed, authentication of the user can be had by way of a manual PIN entry, a fingerprint scan, a manual facial recognition by store personnel, and/or the like. In an automated fashion, one or more of the terminal 320 can also be equipped with BLE signaling and communication devices, such that the presence or close proximity of one or more checked in devices 102 can be read. Automated or automatic check in processes can utilize GPS, triangulation, a signal strength of the different devices 102 to different terminals, and/or the like to estimate where a particular device 102 is located in the checkout process.

In some embodiments, a display readout of several possible devices can be presented to store personnel, such that the right device or user can be readily picked from a subset of all presently checked in devices and customers. For example, the 3 or 5 most likely devices/users for a given checked in customer that is trying to check out can be presented on a terminal 320 for a store clerk. A quick verification of the correct device/user can be made by the clerk, whereupon the final payment and check out process is quickly consummated and finished. In the event that the small subset of 3 or 5 most likely devices does not have the correct device for the customer that is immediately before the clerk, an available input can allow the clerk to expand the possible number of likely choices to 10, 20 or even all currently checked in devices. In the event that the present customer/user/device can still not be found on the menu of selections available to the clerk, then a re-checkin process can take place at the terminal 320 itself.

Methods

Figure 4:
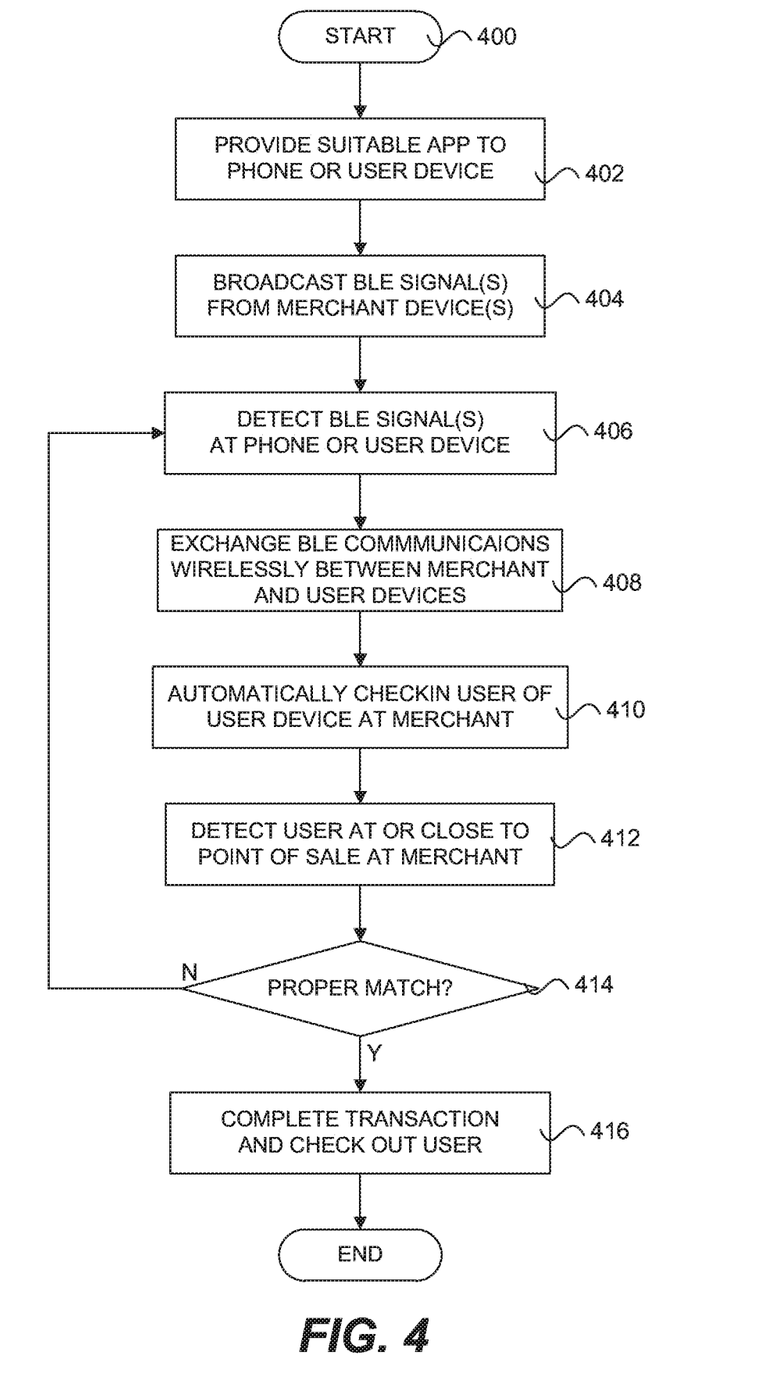
FIG. 4 provides a flowchart of an exemplary method of facilitating payment or credit for a purchase by utilizing an automated wireless consumer checkin according to some embodiments.

Although a wide variety of applications and methods involving the use of BLE to facilitate automatic wireless consumer checkins might be envisioned, one basic method is illustrated here. Turning next to FIG. 4, a flowchart of an exemplary method of facilitating an automatic wireless consumer checkin is provided. In particular, such a method can involve using or operating any of the various computing components, devices, systems and/or networks described above. It will be readily appreciated that not every method step set forth in this flowchart is always necessary, and that further steps not set forth herein may also be included. Furthermore, the exact order of steps may be altered as desired for various applications.

Beginning with a start step 400, a first process step 402 can involve an application, app or other suitable program being provided to a third party user phone or other mobile computing device. Such providing can be performed electronically by a processor, such as on a separately owned server located remotely from the mobile device user. As will be readily appreciated, this providing can be facilitated by the remote processor, such as through an app store or other processor or server owned by another separate party that communicates directly with third party mobile phones and user devices. The app or program can include software code to run a number of functions, including code or information regarding automatic wireless checkins using the phone or other personal mobile device.

At a subsequent process step 404, suitable BLE signals can be broadcast from one or more merchant controlled devices at a suitable store, merchant or other participating establishment. At least one of these BLE signals can then be detected by the third party mobile phone when it comes within range of the BLE signals at process step 406. Again, this detection can be accomplished by enabling the third party phone or other mobile computing device to utilize a Bluetooth low energy protocol to detect the presence of a nearby merchant device using the provided software code. This detecting can occur automatically without any affirmative action by the user, as the program or app can run continuously or semi continuously or intermittently in automated fashion in the background and at low energy and bandwidth levels under a BLE protocol.

At the next process step 408, a wireless communications exchange between the third party phone or mobile computing device and the nearby merchant device can take place. Such an exchange can involve a handshake, exchange of pertinent information and the like, as will be readily appreciated by one of skill in the art. Again, said exchange can occur automatically without any affirmative action by the user of the phone or mobile device. Upon a proper exchange and verification of information, a following process step 410 can involve the owner or user of the phone or other mobile device being checked into the merchant, either on the merchant computer system, on a remote payment service provider system, or both. Again, this checking in of the user or owner of the user device takes in automatically without any affirmative action by the user.

Additional process steps after checkin can then take place as a result of the automatic checkin. For example, a next step 412 can involve detecting the user approaching, waiting in line, and/or trying to pay at a register or other point of sale at the merchant or other participating establishment. This step effectively detects the previously checked in user device, which is now close to or in the process of making a purchase or otherwise checking out. A proper matching inquiry can take place at the register or point of sale at decision step 414. This can involve a register, terminal or bank of same or other point of sale devices detecting numerous checked in user devices at or near a point of sale. One or more automated, manual or mixed processes can then be used to make sure that the right user is being charged for a given transaction, as noted above.

In the event that a proper match cannot be made at step 414, then the process can revert to process step 406 in order to checkin the device and user in a manner that can be used. Once a proper match (and recheckin, if necessary) is found or made at inquiry 414, then the method can continue to process step 416, where the transaction can be completed, payment or credit can be had, and the user can be checked out. The method then finishes at end step 418. Further steps not depicted can include, for example, reviewing signal strengths or other personal identifiers as part of the proper matching process at step 414. Still further steps can include providing offers or advertisements to the known user while he or she is at the participating establishment, assessing for risk in a possible transaction by the known user, extending credit offers, or requiring a PIN or other personal identifier of the user where certain transactions are determined to be more risky than less risky ones. In the event of less risky transactions, a more automated process can allow a user to check out and take goods without any further need for identification, cash, cards, payment, receipts or the like, in a very convenient and streamlined fashion.

Figure 5:
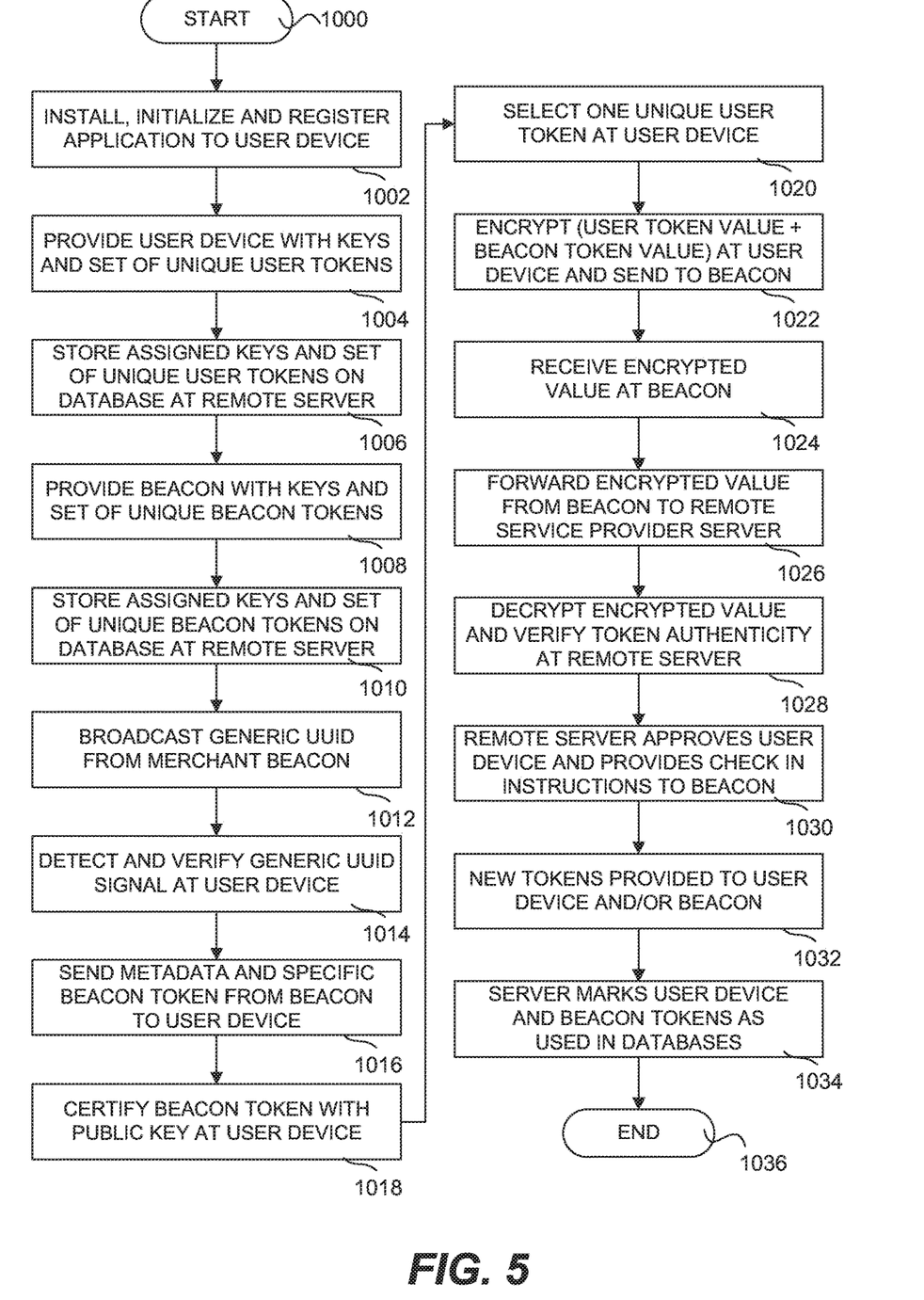
FIG. 5 provides a flowchart of an exemplary method of performing a handshake between a merchant dongle and a purchaser mobile device on an unencrypted channel so as to facilitate a payment or credit for a purchase according to some embodiments.

Turning lastly to FIG. 5, a flowchart of an exemplary method of performing a handshake between a merchant dongle and a purchaser mobile device on an unencrypted channel so as to facilitate a payment or credit for a purchase according to some embodiments. Again, such a method can involve using or operating a merchant dongle, consumer smart phone, and/or any of the other various computing components, devices, systems and/or networks described above. It will again be readily appreciated that not every method step set forth in this flowchart is always necessary, that further steps not set forth herein may also be included, and/or that the exact order of steps may be altered as desired for various applications.

Beginning with a start step 1000, a first process step 1002 is made with respect to signing up a given user device to a remote service provider, such as Paypal. This can involve installing an application on the user device, registering the user, and initializing the application with the registered user. At this point, the device can then be given a set of advance one-time use payment tokens and associated keys at process step 1004. In some embodiments, the associated keys may include a pair of symmetric keys. These user tokens can each have, for example, a user identifier, a token value, a key serial number and an AES or other crypto key, as will be readily appreciated by one of skill in the art. Such user tokens can be assigned by a backend service provider server, such as that which might be the remote service provider noted above. At process step 1006, records of these assigned keys and user tokens are stored on database(s) at the remote service provider, such that it can be known to the provider who such a token belongs to when it is put into use.

At a following process step 1008, one or more merchant beacons can also be supplied with a digital signatures and merchant one-time use tokens. Each check-in and possible purchase or other transaction can then be tracked using a one-time token from both the user device and a merchant beacon or beacon system that checks in the user device. As in the case of the user device above, the keys and tokens for the beacon are also assigned by and stored at the remote service provider for later reference, which can be done at process step 1010. The user device and beacon are now in condition for communications, check-ins and transactions.

At a subsequent process step 1012, a generic UUID is constantly broadcast from the beacon. This UUID is detected and verified as issued by the same service provider by the user device at process step 1014. The user device and beacon then initiate communications, whereupon metadata, a specific one-time use beacon token, and a digital signature can be sent from the beacon to the user device at process step 1016. The application on the user device can then certify the beacon token and verify the digital signature as being issued by the service provider by using a public key from the service provider at process step 1018. Assuming that the beacon token sent over is authentic, the user device then selects one of its assigned one-time use user tokens at process step 1020.

At a following process step 1022, the user device then encrypts both its user token value and the beacon token value together using the key associated with the user token, and then sends this encrypted value back to the beacon, where it is received at process step 1024. Again, all of these communications between the user device and the beacon can be on an unencrypted channel, as any other outside device that might be listening or noting these open communications will not know what to make of the token values without any reference table that knows where those tokens were assigned. In fact, the beacon itself does not know what to make of the combined encrypted value. Rather, the beacon simply forwards this value on a back channel to the remote service provider server at process step 1026. The remote server knows what to do with these values, since it has the details of where and to whom all tokens were assigned in various tables or other storage mechanisms on its database(s).

As such, the remote server decrypts the combined encrypted value at process step 1028 and verifies the authenticity and ownership of both the user token and the beacon (i.e., merchant) token. The remote server then approves of the user device and provides affirmative check-in instructions back to the beacon at process step 1030. It is worth noting that while the communications between the user device and the beacon over BLE are unencrypted, the communications between the beacon and the remote server are on a separate more protected channel. Neither the user device nor any other device need see these communications between beacon and remote server of the service provider. As the user device is then checked in and the one time use tokens for the user device and beacon are both committed to this checkin and any resulting transaction, one or more new tokens can then be optionally provided to the user device and/or the beacon at process step 1032. The remote server then marks both of these tokens as used on its databases at process step 1034, whereupon the "handshake" checkin process or method then ends at end step 1036.

In various embodiments, many respective one-time use tokens can be stored on each of the various user devices and/or beacons at any given time. Selection of a given token from the pool of possible tokens can then be random, which adds some layer of protection from potential fraud or misuse. Further, the requirements that each token be used one time only, and that the combined encrypted token values be verified by the backend provider server tends to prevent or reduce the possibility of token replay or bit fiddling by unscrupulous persons who might otherwise try to make something of the unencrypted and open communications over BLE channels. Again, these tokens can be replenished one at a time as they are used and discarded or otherwise rendered unusable, such as by part of a check in process. Alternatively, or in addition, each user device and/or beacon can also request more tokens from the remote service provider server independently as needed.

Other safety mechanisms to provide better security can include expiration dates on each token, as well as a requirement that the user device be in constant communication with one or more beacons at the merchant from checkin through any checkout and purchase or other transaction. In the event that communications are lost or dropped, then a new checkin with new tokens may be required if desired for security purposes. Further, it is also worth noting that the third party user device does not need to access the private keys of any beacon. Rather, the public keys are all that are necessary for the backend server to verify and authenticate tokens for both the user device and the beacon for checkin and later transaction. In some embodiments, there may be only one pair of public and private keys for all beacons at all merchants, with the private key being on the backend server, and the public key being provided to the mobile device.

Although the foregoing embodiments have been described in detail by way of illustration and example for purposes of clarity and understanding, it will be recognized that the above described embodiments may be embodied in numerous other specific variations and embodiments without departing from the spirit or essential characteristics of the disclosure. Various changes and modifications may be practiced, and it is understood that the disclosed embodiments are not to be limited by the foregoing details, but rather is to be defined by the scope of the claims.

What is claimed is:

1. A system comprising:
a short range wireless communication interface;
a non-transitory memory; and
one or more hardware processors coupled to the non-transitory memory and configured to read instructions from the non-transitory memory to cause the system to perform operations comprising:
broadcasting an identifier over a first range within a merchant location for a merchant using the short range wireless communication interface;
in response to receiving an indication from a mobile device of a user that the mobile device received the identifier, establishing a first short range communication channel with the mobile device using the short range wireless communication interface;
automatically establishing a check-in for the user at the merchant location without input by the user to the mobile device;
assigning a one-time use token to the mobile device for a use in identifying the mobile device during processing of a transaction;
transmitting the one-time use token to the mobile device via the first short range communication channel;
determining that the mobile device is requesting processing of the transaction at the merchant location via a second short range communication channel, wherein the second short range communication channel is unencrypted;
receiving, over the second short range communication channel, an encrypted token from the mobile device, wherein the encrypted token comprises the one-time use token encrypted by an encryption key of a payment provider,
automatically processing the transaction without the input to the mobile device based on the transaction and the encrypted token.

2. The system of claim 1, wherein the short range wireless communication interface comprises a Bluetooth Low Energy (BLE) peripheral device associated with the system, and wherein the system comprises a merchant device system at the merchant location.

3. The system of claim 2, wherein the broadcasting the identifier is performed on an unencrypted channel by the BLE peripheral device.

4. The system of claim 2, wherein the broadcasting the identifier further comprises transmitting, to the mobile device, metadata and a beacon token via the BLE peripheral device.

5. The system of claim 1, wherein the automatically processing the transaction comprises:
sending the encrypted token to a remote server for decryption; and
receiving transaction processing results of the transaction based on the decryption of the encrypted token.

6. The system of claim 5, wherein the transaction processing results comprise a payment from a user account identified by the decryption of the encrypted token to a merchant account identified by the system in the transaction.

7. The system of claim 1, wherein the short range wireless communication interface comprises a point of sale device, and wherein the point of sale device is used during the transaction to communicate with the mobile device over the first short range communication channel.

8. The system of claim 1, wherein the mobile device passively scans for the identifier at a first energy level, and wherein the establishing the first short range communication channel comprises receiving a handshake request for the short range wireless communication interface at an increased energy level over the first energy level.

9. The system of claim 1, wherein the operations further comprise:
transmitting a promotional item to the mobile device using one of the first short range communication channel or the second short range communication channel.

10. The system of claim 9, wherein prior to transmitting the promotional item, the operations further comprise:
determining a location of the mobile device using the one of the first short range communication channel or the second short range communication channel; and
determining the promotional item based on at least the location of the mobile device.

11. The system of claim 10, wherein determining the promotional item based on the location comprises:
identifying a merchandise for sale within a predefined proximity to the location; and
selecting the promotional item based on the merchandise and a history of past purchases associated with at least one of the location or the mobile device.

12. A method comprising:
broadcasting an identifier over a first range within a merchant location for a merchant using a short range wireless communication interface;
in response to receiving an indication from a mobile device of a user that the mobile device received the identifier, establishing a first short range communication channel with the mobile device using the short range wireless communication interface;
automatically establishing a check-in for the user at the merchant location without input by the user to the mobile device;
assigning a one-time use token to the mobile device for a use in identifying the mobile device during processing of a transaction;
transmitting the one-time use token to the mobile device via the first short range communication channel;
determining that the mobile device is requesting processing of the transaction at the merchant location via a second short range communication channel, wherein the second short range communication channel is unencrypted;
receiving, over the second short range communication channel, an encrypted token from the mobile device, wherein the encrypted token comprises the one-time use token encrypted by an encryption key of a payment provider; and
automatically processing the transaction without the input to the mobile device based on the transaction and the encrypted token.

13. The method of claim 12, wherein the short range wireless communication interface comprises a BLE peripheral device, and wherein a merchant device system at the merchant location comprises the short range wireless communication interface.

14. The method of claim 13, wherein the broadcasting the identifier is performed on an unencrypted channel by the BLE peripheral device, and wherein the broadcasting the identifier further comprises transmitting, to the mobile device, metadata and a beacon token via the BLE peripheral device.

15. The method of claim 12, wherein the automatically processing the transaction comprises:
sending the encrypted token to a remote server for decryption; and
receiving transaction processing results of the transaction based on the decryption of the encrypted token.

16. The method of claim 15, wherein the transaction processing results comprise a payment from a user account identified by the decryption of the encrypted token to a merchant account identified in the transaction.

17. The method of claim 12, wherein the short range wireless communication interface comprises a point of sale device, and wherein the point of sale device is used during the transaction to communicate with the mobile device over the first short range communication channel.

18. The method of claim 12, wherein the mobile device passively scans for the identifier at a first energy level, and wherein the establishing the first short range communication channel comprises receiving a handshake request for the short range wireless communication interface at an increased energy level over the first energy level.

19. The method of claim 12, further comprising:
determining a location of the mobile device using one of the first short range communication channel or the second short range communication channel;
identifying an item available within a predefined proximity to the location;
determining a promotional item based on the item; and
transmitting the promotional item to the mobile device using the one of the first short range communication channel or the second short range communication channel.

20. A non-transitory machine-readable medium having stored thereon machine-readable instructions executable to cause a machine to perform operations comprising:

broadcasting an identifier over a first range within a merchant location for a merchant using a short range wireless communication interface;

in response to receiving an indication from a mobile device of a user that the mobile device received the identifier, establishing a first short range communication channel with the mobile device using the short range wireless communication interface;

automatically establishing a check-in for the user at the merchant location without input by the user to the mobile device;

assigning a one-time use token to the mobile device for a use in identifying the mobile device during processing of a transaction;

transmitting the one-time use token to the mobile device via the first short range communication channel;

determining that the mobile device is requesting processing of the transaction at the merchant location via a second short range communication channel, wherein the second short range communication channel is unencrypted;

receiving, over the second short range communication channel, an encrypted token from the mobile device, wherein the encrypted token comprises the one-time use token encrypted by an encryption key of a payment provider; and automatically processing the transaction without the input to the mobile device based on the transaction and the encrypted token.

* * * * *